United States Patent [19]
Latham et al.

[11] Patent Number: 5,913,684
[45] Date of Patent: Jun. 22, 1999

[54] COMPUTER CONTROLLED ROBOTIC SYSTEM FOR UNENCUMBERED MOVEMENT

[75] Inventors: Roy W. Latham, Mountain View; David R. Marsh; Peter O'Driscoll, both of Los Altos, all of Calif.

[73] Assignee: Computer Graphics Systems Development Corporation, Mountain View, Calif.

[21] Appl. No.: 08/790,439

[22] Filed: Jan. 29, 1997

[51] Int. Cl.[6] .................................................. A63B 69/18
[52] U.S. Cl. ............................ 434/247; 434/253; 482/8; 482/70; 482/900; 482/901
[58] Field of Search ..................... 434/247, 253; 482/1–9, 51, 70, 71, 900, 902, 54, 901

[56] References Cited

U.S. PATENT DOCUMENTS

| | | | |
|---|---|---|---|
| 4,906,192 | 3/1990 | Smithard et al. | 482/902 |
| 5,049,079 | 9/1991 | Furtado et al. | 482/902 |

*Primary Examiner*—Richard J. Apley
*Assistant Examiner*—Glenn E. Richman
*Attorney, Agent, or Firm*—Douglas M. Clarkson

[57] ABSTRACT

A locomotion simulator has two independently controlled movable footpads. Each footpad is positioned dynamically in three-dimensions. The top of each footpad has a controlled rotational motion, and the assembly having the two footpads is rotated under control. In operation, a user, whose feet are tracked in position and angle, walks or runs on the simulator and the footpads are controlled to simulate ground contact. Controlled rotation and translation movements permit simulation of turning, climbing, and decending.

15 Claims, 15 Drawing Sheets

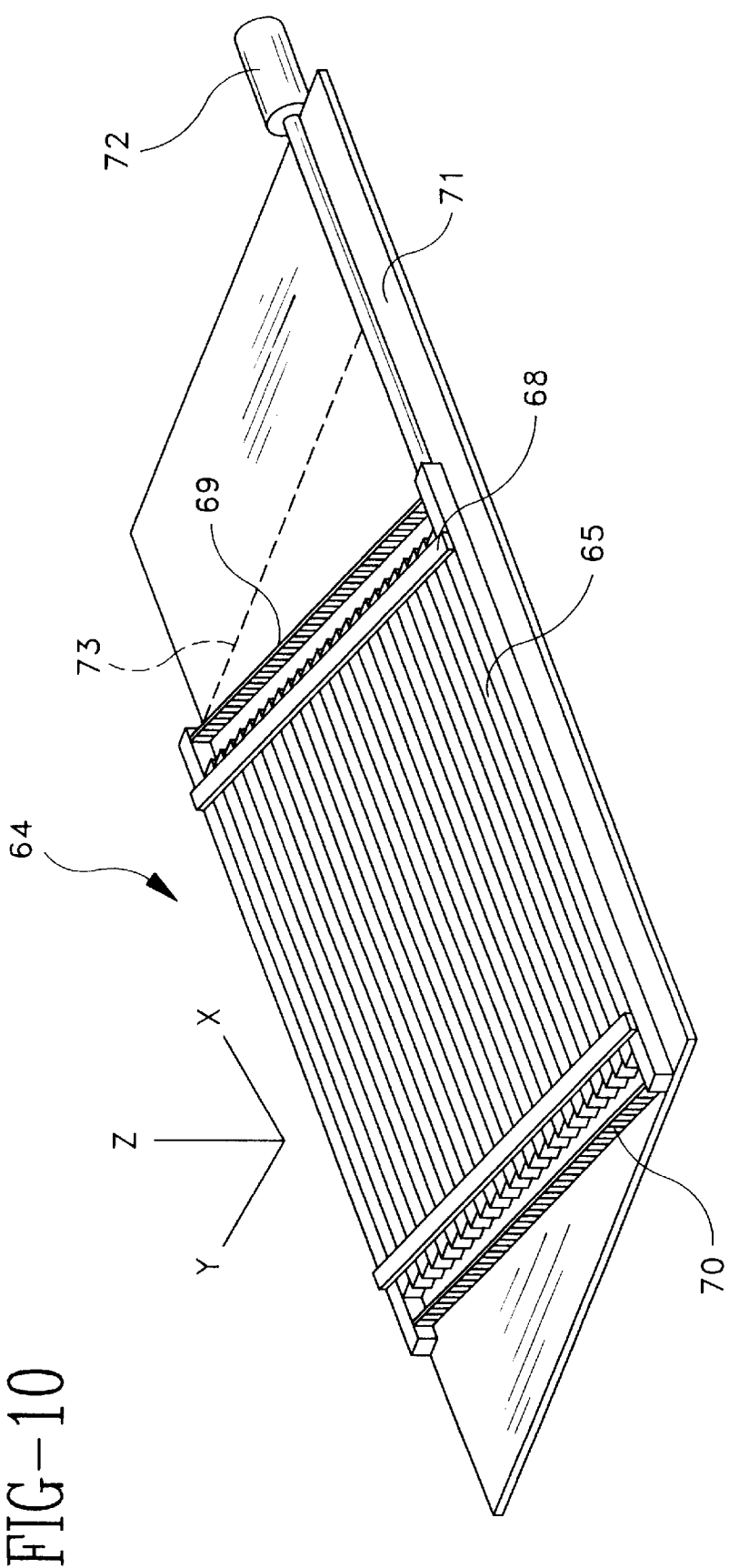
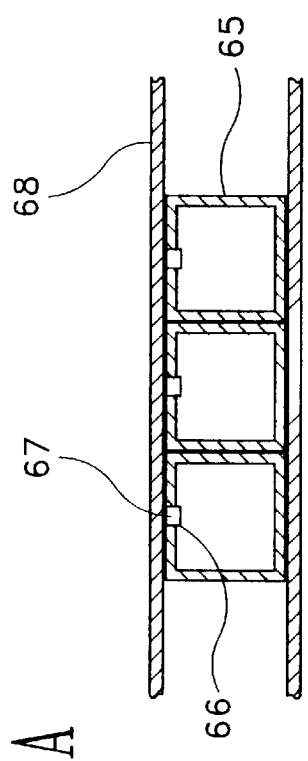
FIG-10
FIG-10A

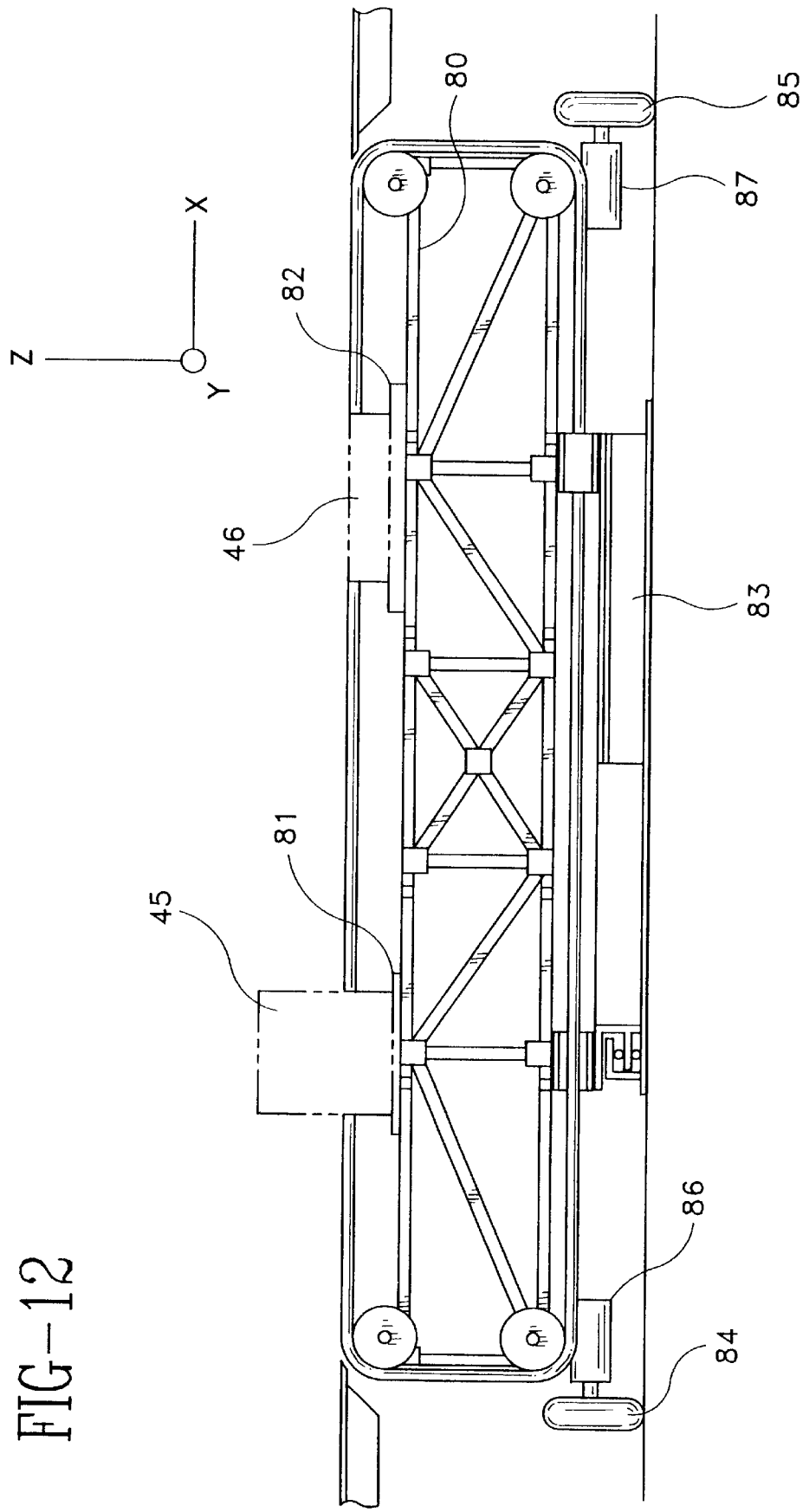

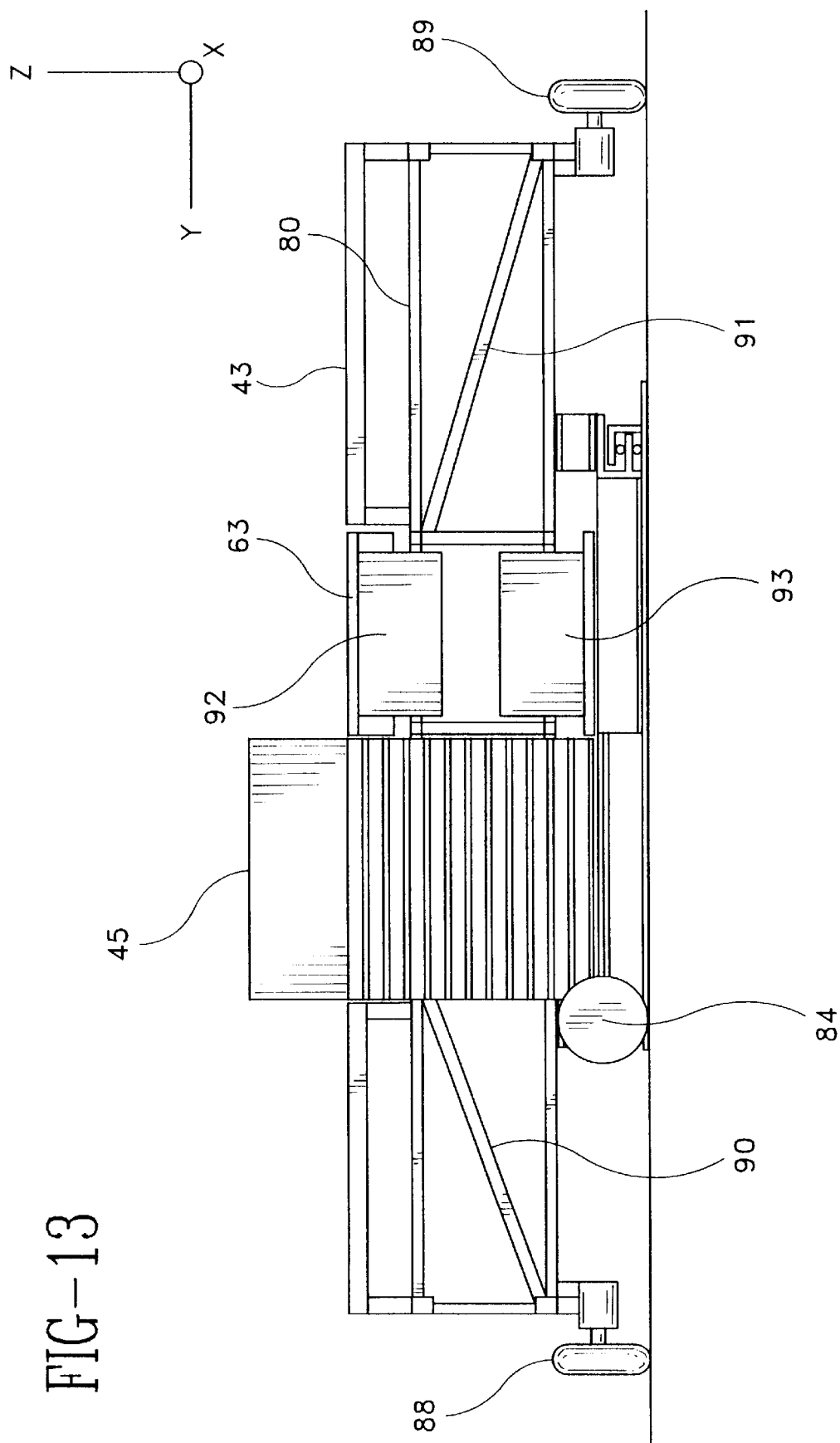

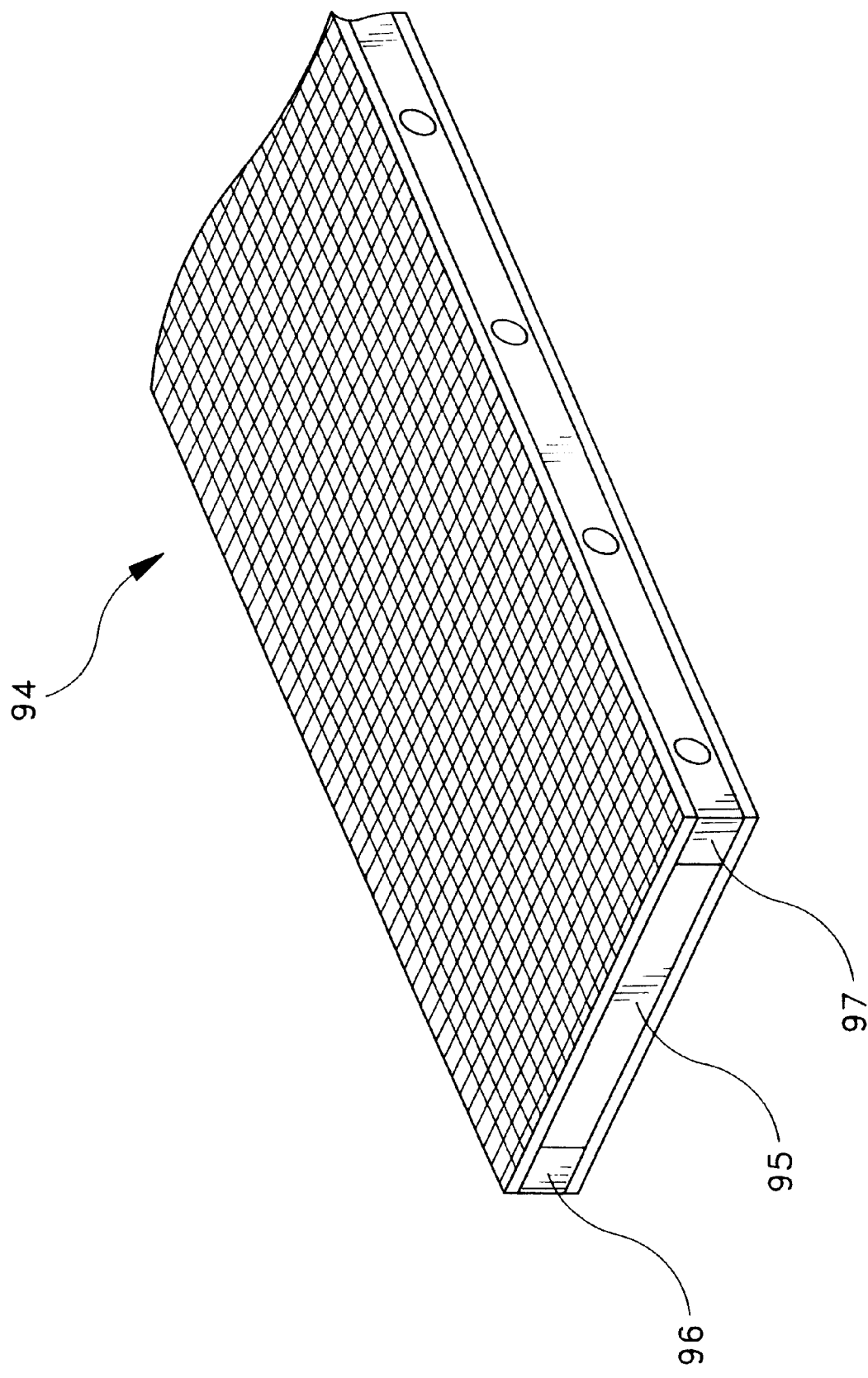

COMPUTER CONTROLLED ROBOTIC SYSTEM FOR UNENCUMBERED MOVEMENT

FIELD OF THE INVENTION

The present invention, generally, relates to training and entertainment systems and, particularly, to a system that allows a user to perform realistic motions without concern for mechanical attachments.

1. Background of the Invention

Edwin Link invented the flight simulator in the 1930's. Flight simulators allow people to experience a certain type of simulated world for various purposes, including training and development.

It has proved more difficult to provide simulated motion platforms for walking, running, and other forms of human locomotion. Present day exercise treadmills, for example, do not permit turning while walking or running, do not simulate climbing stairs or traversing uneven terrain, and in general do not respond to the user's changes in speed.

2. Description of the Proir Art

U.S. Pat. No. 5,277,678 to Friedebach et al. describes an exercise machine for simulating cross country skiing that permit confined motion for both hands and feet.

U.S. Pat. No. 4,434,981 to Norton describes a different simulating exercise machine that uses a pair of foot carrying platforms for constrained movement.

U.S. Pat. No. 4,074,903 to Diez de Aux describes still another ski simulating apparatus with the power provided by the user.

It should be noted that each of these prior patents, which are typical of prior efforts, emphasize such features as:

1) Power provided by the user;
2) Feet of the user are not tracked;
3) Motion direction is constrained; and
4) Walking and running motion is limited.

U.S. Pat. No. 5,490,784 to Carmein describes a device primarily for simulating rotational motion without use of foot tracking or any means of control for a foot pad.

While these prior arrangements may be effective for their stated purposes, what is needed today is a system to permit a user to walk or run in any direction, make turns and climb or descend hills or stairs, all without actually leaving the confines of a small area.

Moreover, when the simulating system of the present invention is utilized, as will be described in detail presently, it provides other advantages not available and not even contemplated by the prior arrangements.

OBJECTS AND SUMMARY OF THE INVENTION

Accordingly, it is a principal object of the present invention to provide a computer controlled robotic system that admits of operation not encumbered by mechanical attachments.

It is also an object of the present invention to provide a new and improved system for simulating unencumbered movement within a limited space.

Briefly, a system constructed and arranged in accordance with the present invention provides features such as: a user's feet are not attached to the system; a user is not tethered or restrained; there are no cables from a user to the electronics for the system; and a user can kneel or lie down readily.

The above and other objects, advantages and features of the present invention will become more apparent from the following detailed description of the presently preferred embodiment as illustrated in the accompanying drawings.

BRIEF DESCRIPTION OF THE DRAWINGS

FIG. 10 and 10A illustrate the structural arrangement of a rotopad assembly of the present invention.

FIG. 12 illustrates the truss structure in one perspective for supporting rotationally the system of the invention.

FIG. 13 illustrates the rotational support truss of the present invention in a different perspective.

FIG. 14 is a view in perspective illustrating details of a tambour slat structure in accordance with the invention.

DETAILED DESCRIPTION OF THE INVENTION

One of the important features of a system constructed and arranged according to the principles of the present invention is that only that part of the ground, floor, or whatever, that a user touches or otherwise contacts needs to be simulated. For example, a walking or a running user's feet only touch relatively small patches of ground or floor, and therefore, only these patches need to be simulated, since that is the part actually touched.

When walking, a user's weight shifts from one foot to the other, and the other foot, i.e., the traveling foot is not in contact with the ground or floor. When running, both feet are sometimes off the ground simultaneously, depending on the individual and the running speed.

The system of the present invention uses the time each foot is off the ground to relocate and reorient a footpad assembly and the support for the footpad assembly. A system in accordance with the invention provides six degrees of freedom for each foot and for the entire system of the invention.

In prior efforts to simulate the type of body movement described above, each moving body part must be tethered or otherwise attached by some form of mechanical connection in order to provide data indicating position and/or attitude.

The system of the present invention avoids the necessity of such connections.

Figure 1:
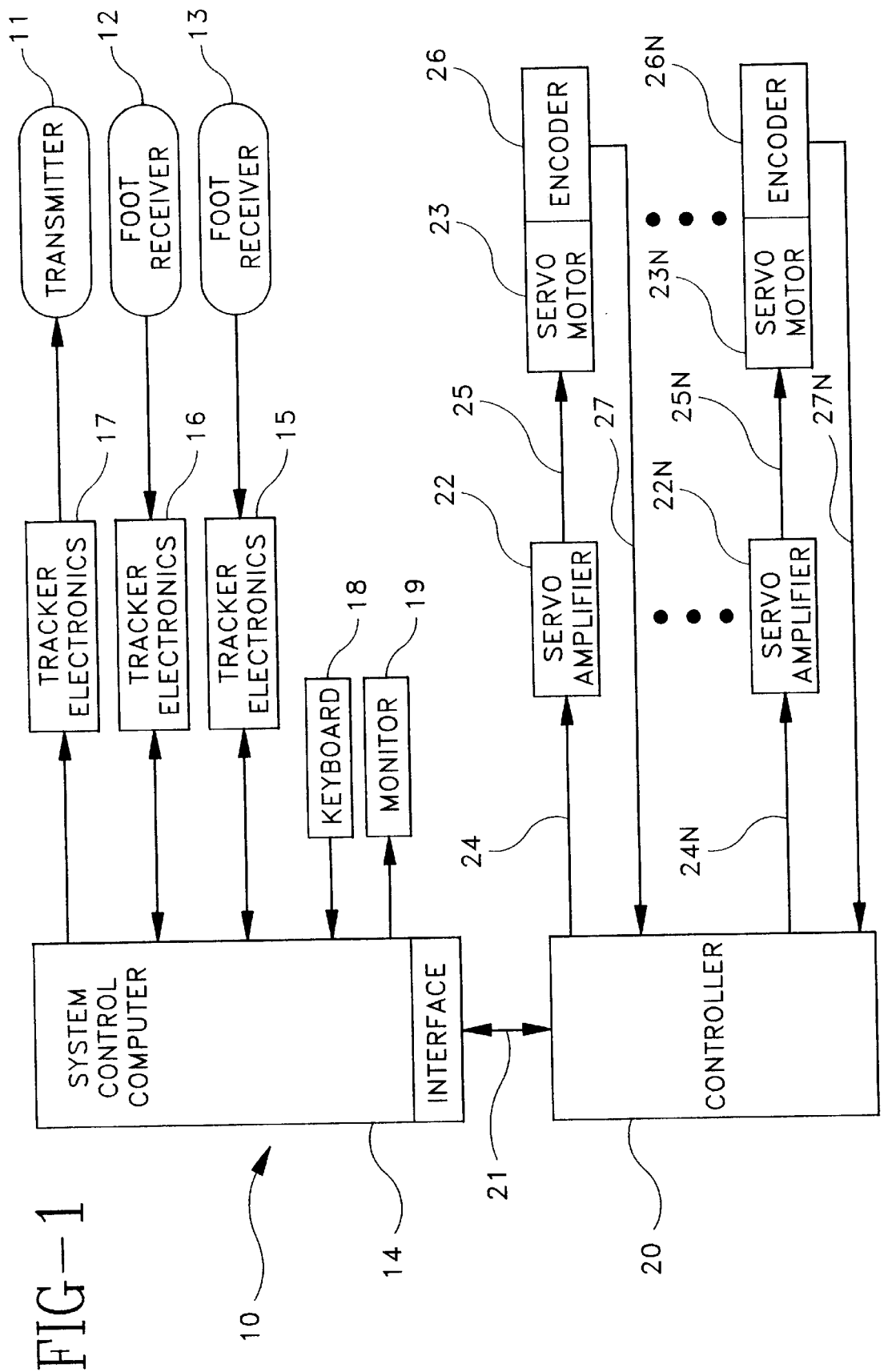
FIG. 1 is a block diagram illustrating interconnections between various hardware components to achieve features provided by the present invention.

In FIG. 1, a block diagram illustrating the electronic and electromechanical components is identified generally by the reference numeral 10 and is contemplated to be marketed under the trademark omnitrex.

The transmitter 11, foot receivers 12 and 13, one for each foot, and tracker electronics 15, 16, and 17 work in conjunction to provide foot position and attitude data to the system of the invention. Transmitter 11 emits a series of electro-magnetic pulses which are received by foot receivers 12 and 13. The received pulses are processed by tracker electronics 15 and 26 to provide position and attitude data, which is sent to a system control computer 14. While magnetic trackers are described above, there are in existence now other tracker devices such as optical, radar, and ultra-violet light to identify a few, any of which can function with the system of the invention.

The system control computer 14 is an off-the-shelf IBM PC compatible computer, which is programmed to provide overall system control and synchronization. Moreover, the system control computer 14 provides a means to interface the respective elements of the system.

System initialization is accomplished via keyboard 18 and monitor 19.

The foot tracker data is used by the system control computer 16 to create motion commands, these commands are sent to a controller 20 by means of a cable 21. A component that is available commercially and that has been found to function satisfactorily as a controller 20 is known in the market as a Delta Tau PMAC.

The controller 20 executes motion commands that are received from the system control computer 14, and in response to these commands, it develops servo motor commands that are sent to the appropriate servo amplifier 22-22n and servo motor 23-23n through cables 24-24n and 25-25n, respectively. Each servo amplifier 22 drives a single servo motor 23, servo controlled pneumatic valve or servo controlled hydraulic valve.

An encoder 26 is mounted on, or otherwise connected to, the shaft of each servo motor 23, and also, a similar encoder is connected with each servo controlled pneumatic valve and each servo controlled hydraulic valve. In this way, a true instantaneous position signal is sent back to the controller 20 by means of an appropriate cable 27-27n, where it is used as a partial basis for developing subsequent commands for the servo motors 23-23n.

The respective components used for the motion control portion of the system described above are available commercially as off-the-shelf components. It is their interconnection and the resulting function that provides the distinctive features of the present invention.

The motion commands that are created by the system control computer 16 are based on instantaneous data inputs from the foot receivers 12 and 13, and a human motion algorithm. The commands are passed to the controller 20 which:

communicates with and synchronizes to the system control computer 14 commands;

performs periodic checks to ensure that no velocity or acceleration safety limits are exceeded;

clamps acceleration and velocity to preset limits when safety limits are exceeded;

controls a set of indicator lights showing various warning conditions; and calculates the necessary servo motor 23-23n commands based on commands from the system control computer 14.

The motion that is needed from any of the servo motors 23-23n is represented by an analog signal which is the output from the controller 20. This is a low voltage signal which is amplified by the appropriate servo amplifier 22-22n to which the servo motor 23-23n is connected by a cable 24-2n.

The feedback from the position encoders 26-26n that are mounted on the motor/valve shafts is connected to the controller 20 to provide current position information. This current position information allows the controller 20 to develop the control signals that provide its smooth, high performance motion.

Figure 2:
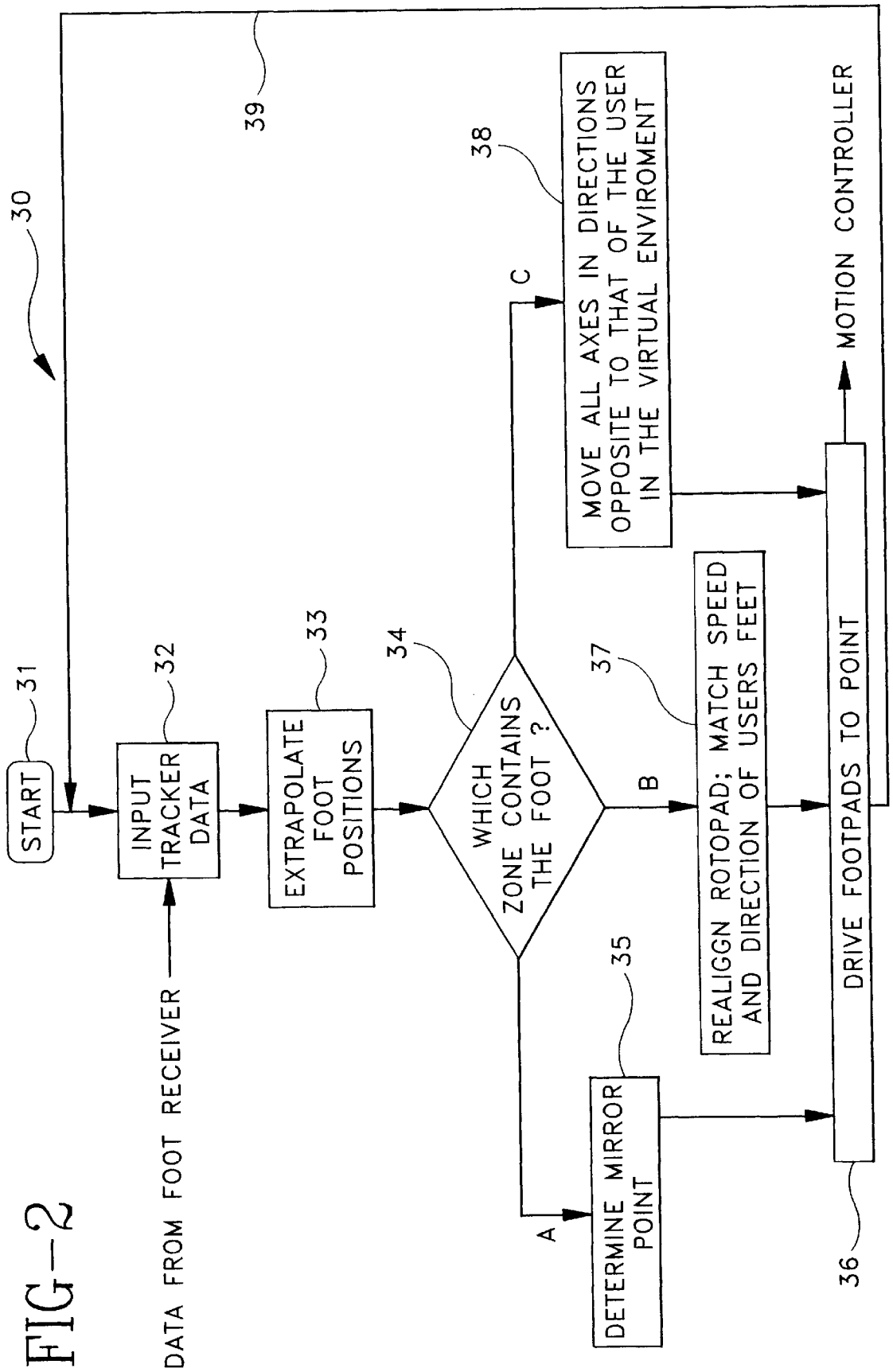
FIG. 2 is a flow chart that illustrates the steps to obtain the features of the present invention.

Referring next to FIG. 2 of the drawings, the system control computer 14 executes a series of actions according to a particular software program, which will be described as follows. FIG. 2 is a flow chart that illustrates the control software of the system of the present invention and is identified generally by the reference numeral 30.

The system software that is illustrated in FIG. 2 controls the system 10 described above by creating signals and sending them to the multi-channel servo motion controller 20. It is signals from the controller 20 that drive various positioning servo motors 23-23n.

Data is received by the system control computer 14 from a foot receiver 12 or 13 that indicates the position and attitude of a user's feet.

It is data from a foot receiver 12 and/or 13 that indicates the position of the foot or feet of a user, and broadly, it is the data signals developed by the control software 30 connected to the multi-channel servo motion controller 20 that drive the various positioning servo motors 23-23n in order to achieve the successful operation of the present invention.

The operation of the control software 30 is initiated by the system control computer 14, and once initiated, program step 31 initializes the system. The following steps then operate continually in a loop manner.

The step 32 receives data from the foot receivers through the system control computer 14 by means of suitable trackers (not shown) but symbolized by the transmitter 11 and the respective tracker electronics 15, 16, and 17.

Such data is stored to form a sequence from which future foot position is predicted by extrapolation, indicated by step 33. This step of extrapolation is necessary to compensate for delays in positioning footpad assemblies, to be described presently. The predicted position of a user's foot is used to control the positioning of footpad assemblies to be described next.

Continuing with FIG. 2, the virtual environment is divided into three predetermined volumes, designated as zone A, zone B, and zone C. Zone A contains the user and the space up to about six inches from the surfaces of the footpad assemblies in the virtual environment.

Zone B extends from zone A to approximately 0.5 inches from the footpad assemblies. Zone C extends from Zone B to the surfaces of the footpad assemblies.

If program step 34 determines that a foot is in zone A, program step 35 computes the mirror point for the associated footpad. The mirror point is the closest point to the extrapolated position of the user's foot that the footpad assembly can achieve in the X and Y axes.

The motion controller 20, FIG. 1, is commanded to move the footpad assembly to the mirror point by the program step 36. By keeping the footpad assembly near the user's foot, the time to make the final position adjustment is minimized.

If program step 34 determines the foot is in zone B, program step 37 computes the proper rotopad position and alignment, rotating surface alignment, to be described next, to achieve position, motion, and alignment of the footpad to match the speed and direction of the footpad assembly to that of the user's foot.

If, on the other hand, program step 34 determines the foot is in zone C, then program step 38 computes the commands which will move the footpad assembly, the rotopad, and rotating surface in directions opposite to that of the user in the virtual environment, so as to keep him centered in the system.

After completion of the above described steps, the cycle repeats, indicated by the connection 39.

Figure 3:
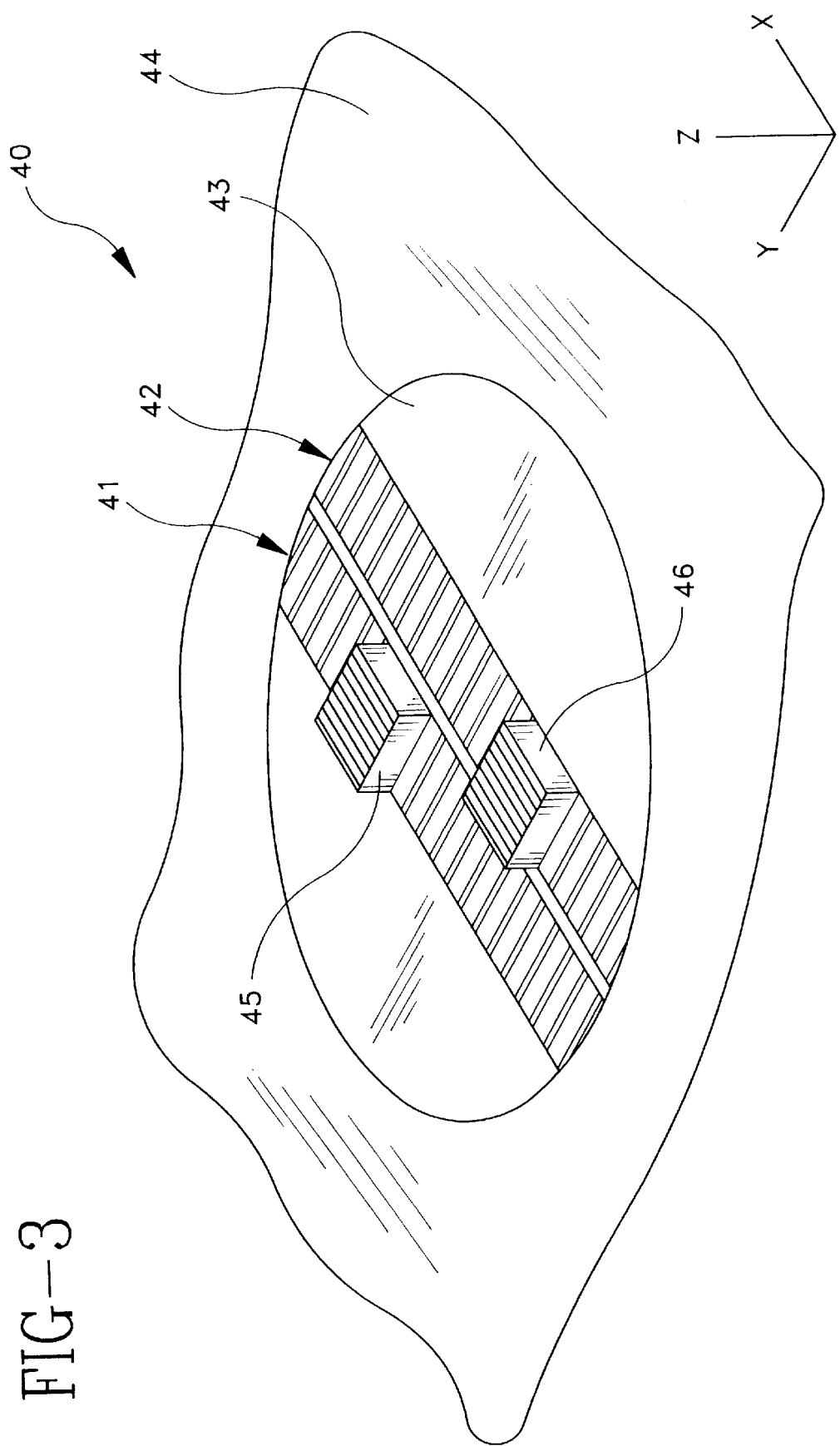
FIG. 3 is a view in perspective of an operating surface illustrating several components of the invention.
Figure 4:
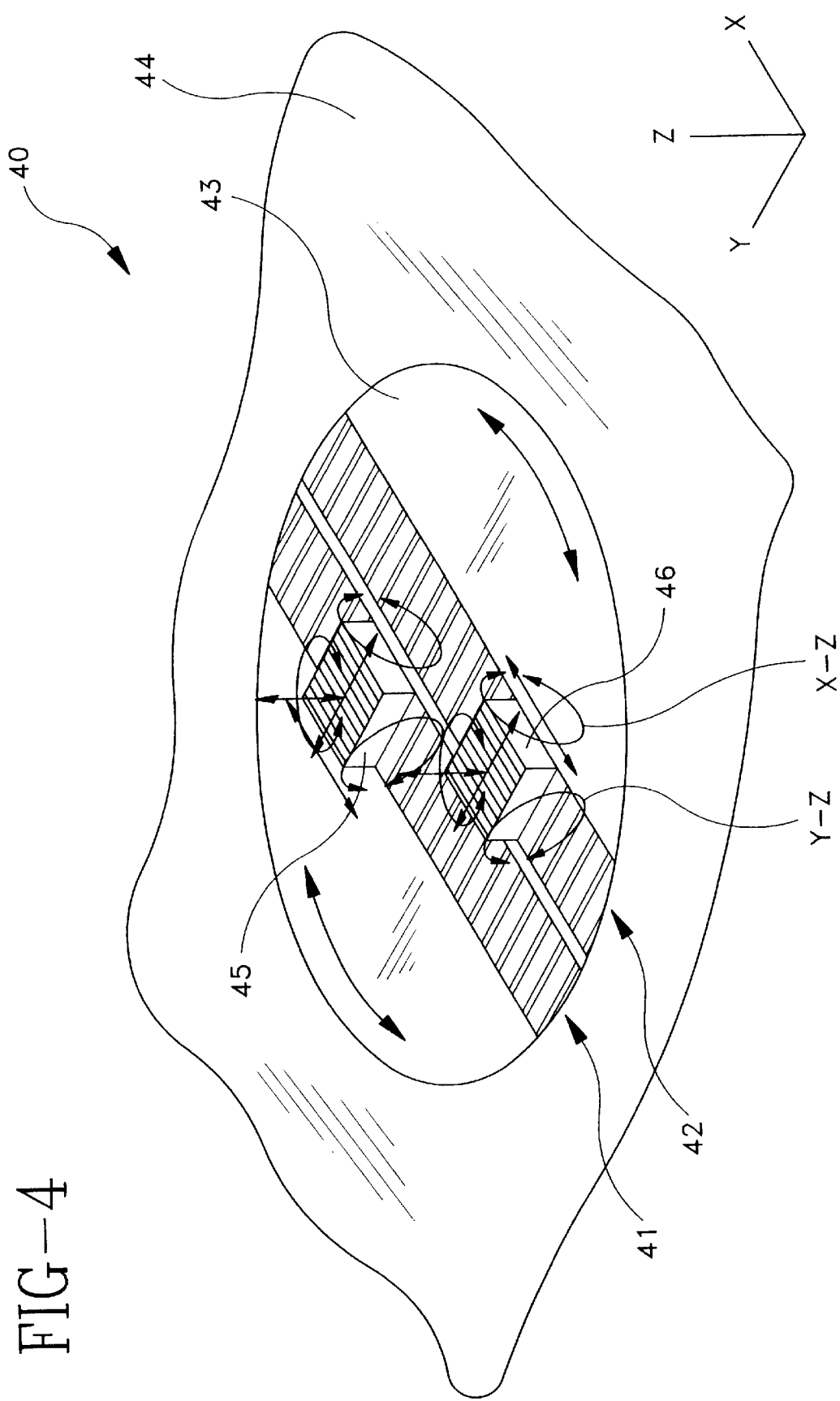
FIG. 4 is a view in perspective illustrating the various degrees of freedom of motion provided by the present invention.

Referring now to FIG. 3 and FIG. 4 of the drawings, the mechanical assembly is identified generally by the reference numeral 40. The footpad assemblies 45 and 46, one for each foot, are used for the feet of a user. Tambour assemblies 41 and 42 serve to protect the user from the mechanism below. A footpad assembly 45 or 46 along with a tambour assembly 41 or 42 comprise a stepper unit. The important components of the mechanical assembly 40 are described with reference to FIG. 3 and FIG. 4.

Referring first to FIG. 3, the mechanical assembly 40 consists of two stepper units supported in side-by-side relation on a rotatable surface 43. The rotatable surface 43, in turn, is supported by a fixed surface 44, which is a wooden floor on a steel frame. This mechanical assembly 40 provides a working surface for interface with the user in a manner that will be described now in more detail.

In FIG. 4 of the drawings, the interface degrees-of-freedom provided by the system of the present invention, are defined by the global coordinates of the fixed surface, and are illustrated as X, Y, and Z. The respective directions of movement for each component in this movable part of the mechanical assembly 40 are illustrated by arrows that show the various movements.

Figure 5:
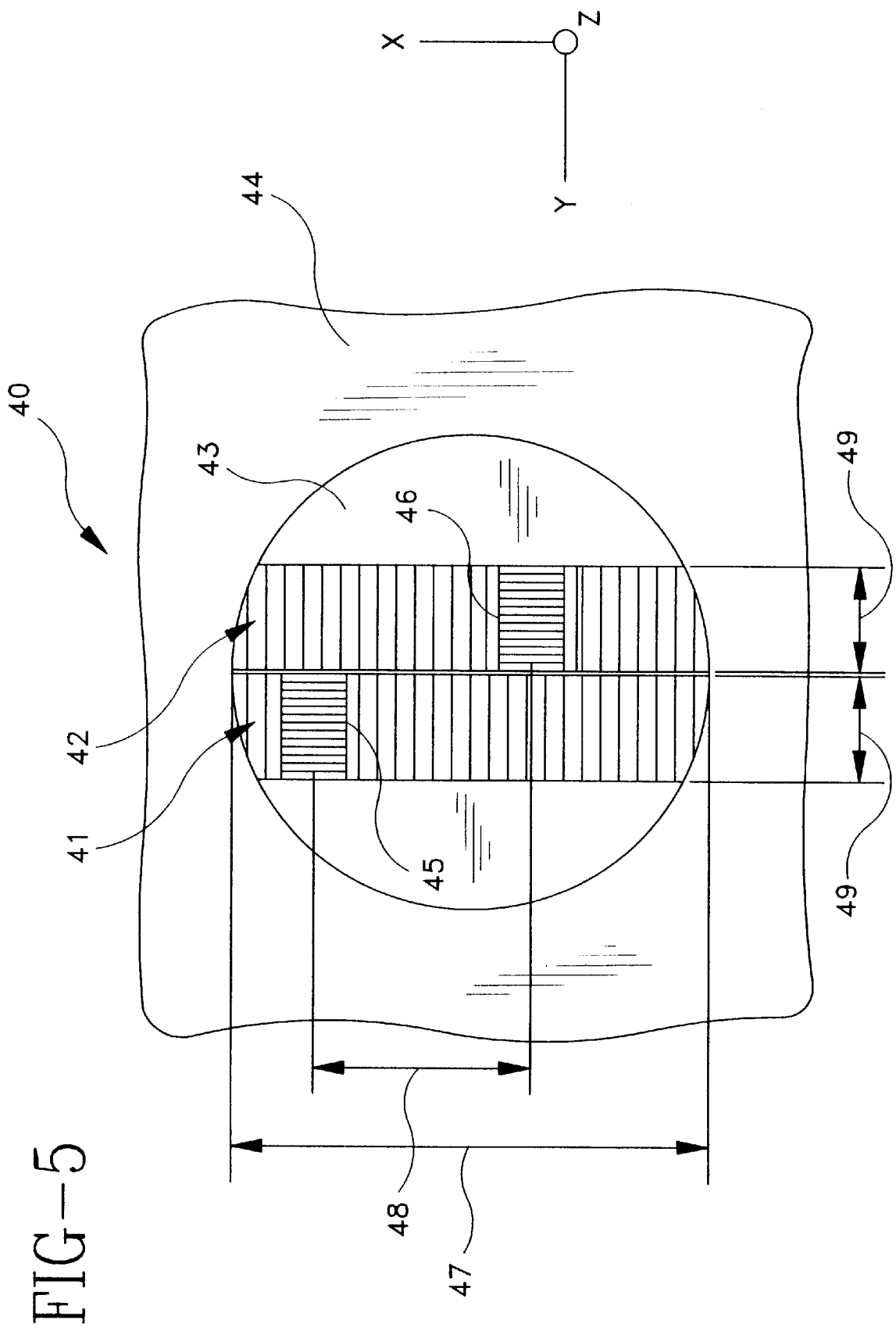
FIG. 5 is a view illustrating principal dimensions of surfaces in accordance with the present invention.

Principle dimensions of the mechanical assembly 40 are shown with reference to in FIG. 5. Mechanical assembly 40 presents a clean simple surface to the user, with seals between adjacent moving edges to avoid pinching fingers or trapping loose ends of clothing or equipment.

The distance from a footpad assembly 45 to a footpad assembly 46 is in the order of five feet, matching the normal stride of a user while moving at a rapid pace or running. The diameter of the rotatable surface 43 is in the order of 10 feet, 6 inches.

The diameter of the rotatable surface 43 is indicated by the numeral 47 in FIG. 5, and the distance between the footpads is indicated by the numeral 48.

Figure 6:
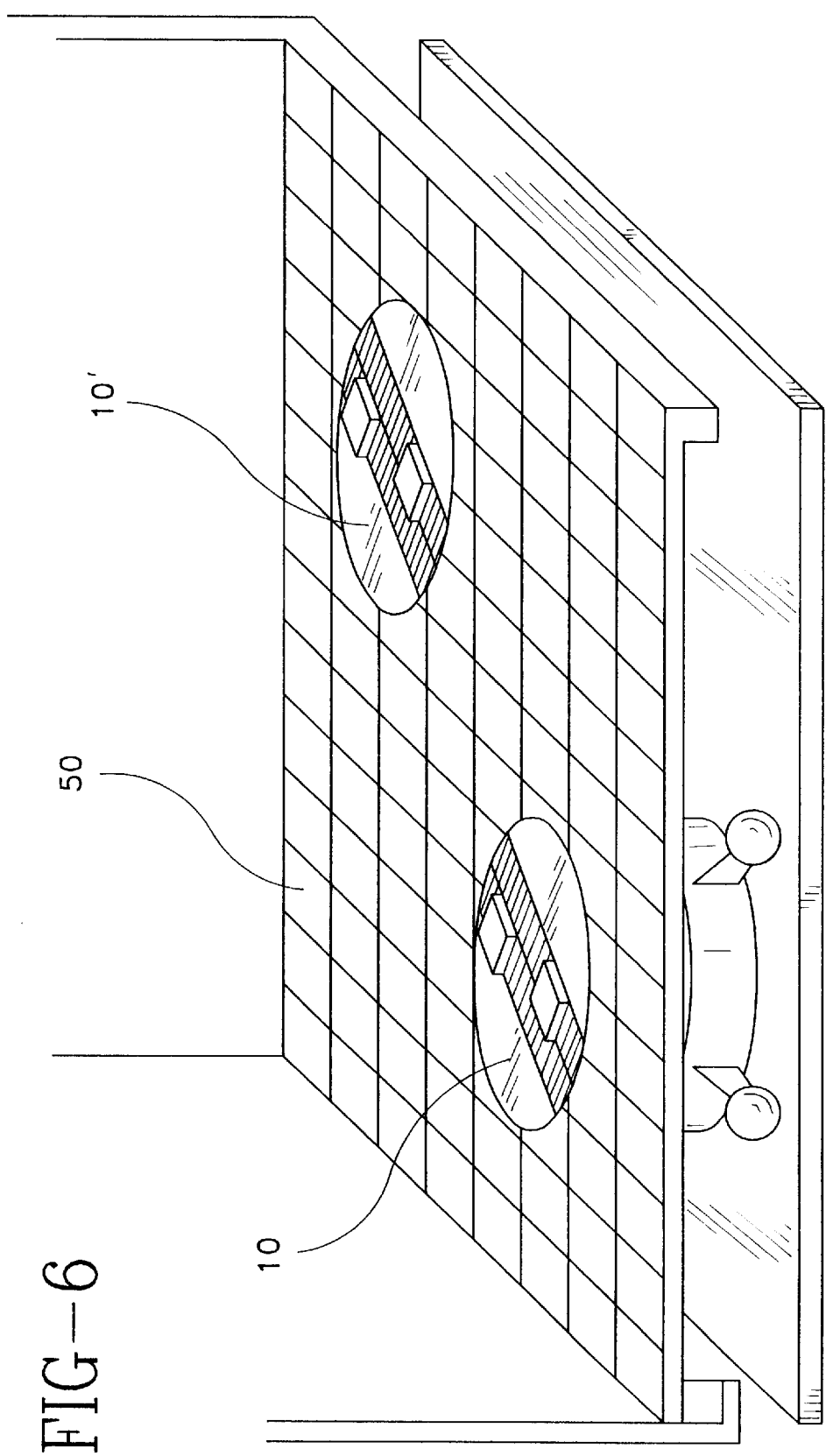
FIG. 6 is a view in perspective of an installation arranged in accordance with the invention with two assemblies of surfaces.

Describing further details of the hardware portion of the invention, reference is made to FIG. 6 showing two mechanical assemblies 40 on a single fixed surface 44. In this view, each mechanical assembly 40 and the second system 40' is supported by the facility floor 50 providing the fixed surface 44 described supra.

The surface of each rotatable surface 43 and 43' is flush with the facility fixed surface 44 which surrounds each. Therefore, when the footpad assemblies of the two mechanical assemblies 40 and 40' are retracted, a user will feel, when crawling or lying prone, a flat surface that can even be textured depending on the simulation involved.

Figure 7:
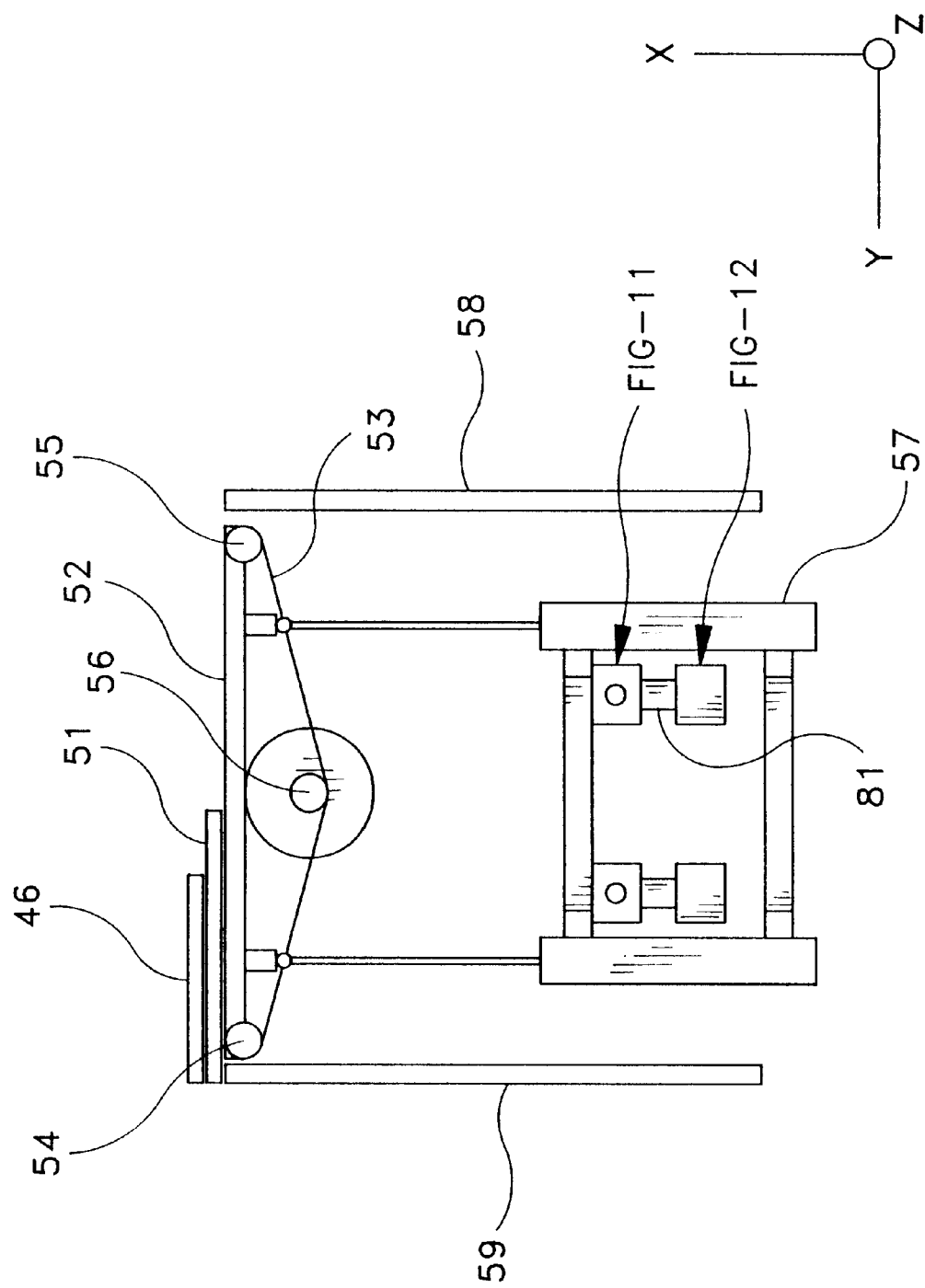
FIG. 7 illustrates a vertical cross section in one perspective of a stepper assembly of the present invention.

FIG. 7 shows a cross section of a footpad assembly 45 or 46. A Y transport 51, in FIG. 7, is a flat board which travels on rollers (not visible) inset in a supporting surface 52 beneath it. The Y transport 51 is driven by at least one drive cord 53 which leads though pulleys 54 and 55 to a drive motor 56.

All flat bearing surfaces are preferred to be laminates of uni-directional graphite fiber, bonded to plywood cores to give maximum stiffness and strength and minimum weight. The Douglas fir plywood cores are preferred to resist crushing under the imposed foot loads.

On the surface of each of the Y transports 51 is a rotopad assembly identified generally by the reference numeral 64, to be described in greater detail hereinafter. The compound surface of each footpad assembly 45 and 46 has Z motion imparted by three vertically oriented Z rams 57.

Because each of the Z rams 57 is controlled independently, the surface can be rotated in the X-Z and in the Y-Z planes, FIG. 4. Rod end bearings (not shown) are provided at the interface between the Z rams 57 and the frame above them. If large Z displacements are required, second order lateral displacements will be allowed at the rod ends.

Provision is made to prevent a foot from getting caught beneath a fast-moving footpad assembly. This is done by providing safety surfaces on all four sides of each footpad assembly 45 and 46.

The arrangement of these safety surfaces presents a challenge because these safety surfaces must rise and fall rapidly with the moving footpad. They must also be thin so that they fit between passing footpads and can retract into slots too narrow to trap a finger or clothing. In FIG. 7, there are two side guards 58 and 59 visible on the sides of the footpads. These are formed preferably of 0.125 inch thick aluminum plate, which can freely slide over the outer bounds of the footpad assemblies 45 and 46, FIG. 3.

Figure 8:
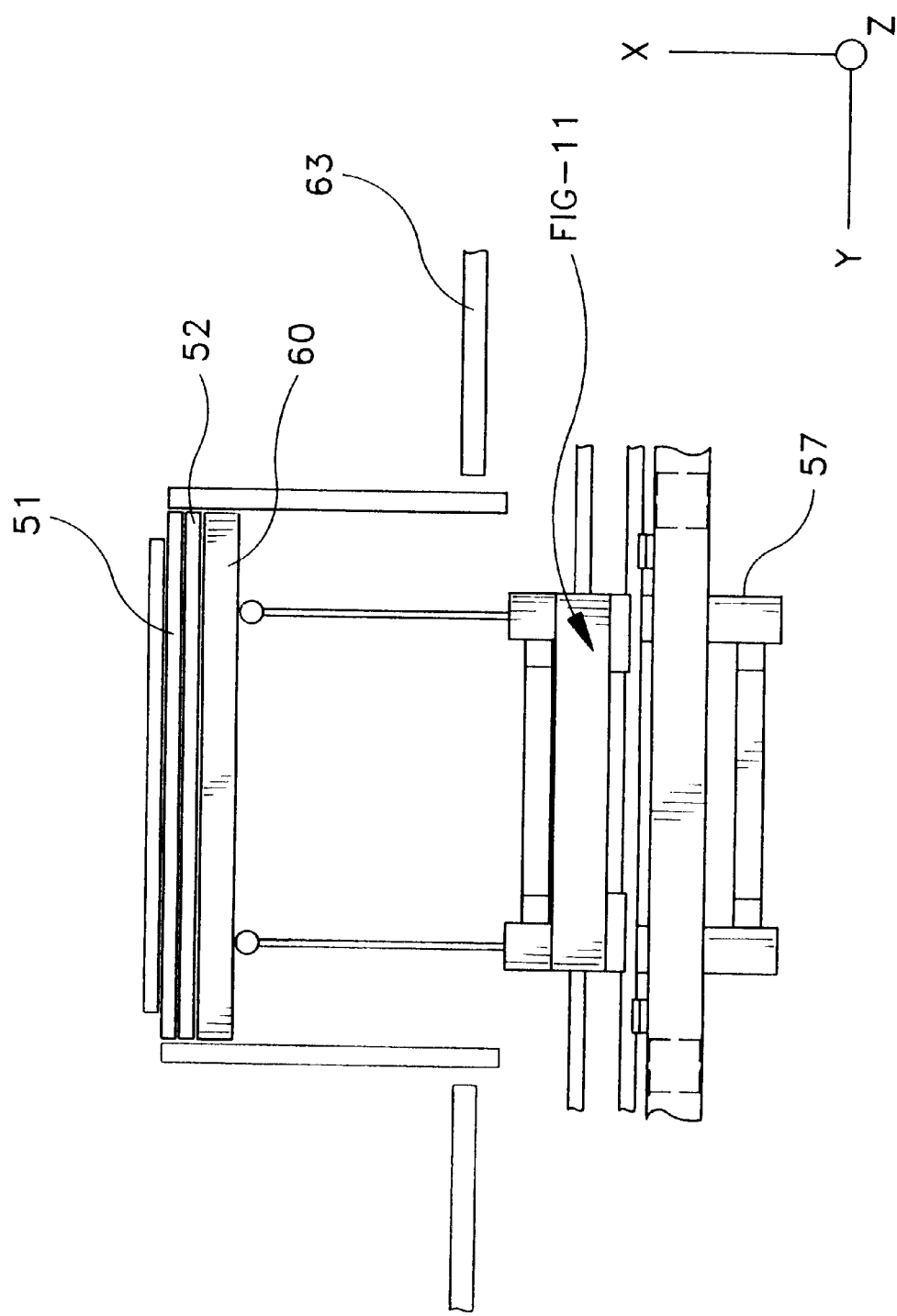
FIG. 8 illustrates the vertical cross section in a different perspective of the stepper assembly of the present invention.

As illustrated in FIG. 8, the supporting surface 52 is mounted on a frame 60 of welded square steel tube. One of these is for each of the footpad assemblies 45 and 46 in the mechanical system 40.

Figure 9:
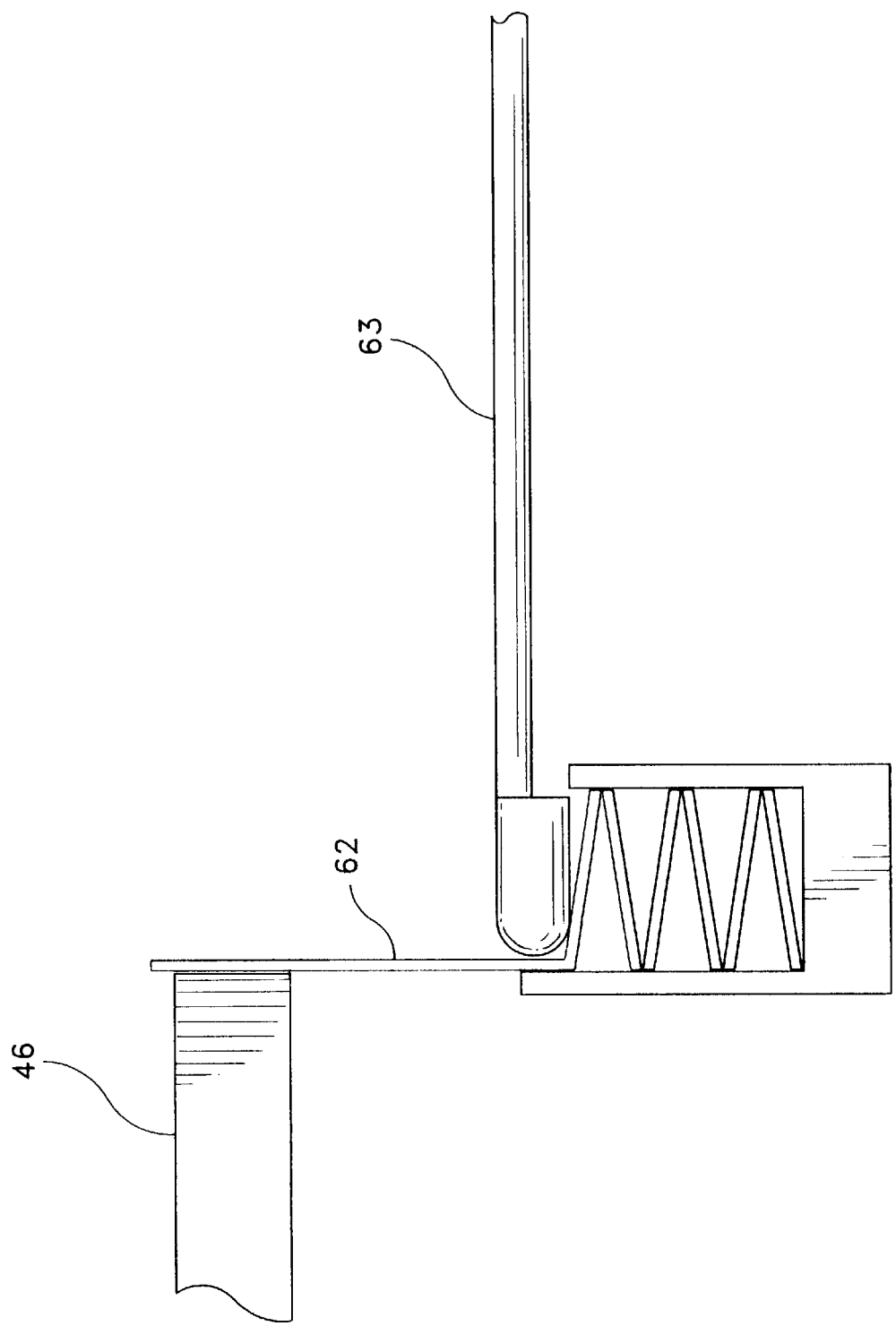
FIG. 9 is a view illustrating movement of safety curtains in accordance with the invention.

FIG. 9 illustrates that there are fore and aft safety curtains 61 (not shown) and 62 provided also, but these would interfere with the drive mechanisms if they were rigid. These are spring-loaded folding aluminum plates which are stowed beneath the surface of an X tambour 42 at their attachment to the footpad assembly 46.

As illustrated in FIG. 10 of the drawings, a rotopad assembly 64 provides simulation of rotation under a foot by differential linear displacements across its surface. The rotopads form the surfaces that actually contact the feet of a user.

One rotopad 64 is located on the top of each footpad assembly 45 and 46, FIG. 4. The rotopads 64 are necessary because feet are normally about 2 inches apart, or less, during walking. This tolerance could not be met if the feet were supported on rotating surfaces.

The rotopads 64, one of which is illustrated in FIG. 10, are made of multiple pieces of 0.5 inch square steel tubing 65, each about 15 inches in length. At each end of each piece of tubing 65 is a slot 66 to receive a dowel pin 67 that extends from a cross member 68, shown in the detail in FIG. 10A.

The square tubes 65 are held side-to-side by two coil springs 69 and 70 and slide in the X direction on a smooth steel base plate 71. Displacement by sliding on the base plate 71 is controlled by a hydraulic actuator 72 which moves one of the cross members 68 relative to a neutral position line 73. Hydraulic power is used to permit use of a more compact actuator.

Details of a footpad assembly 45 and/or 46 x motion will be described in more detail now with reference to the pneumatic-magnetic actuator in FIG. 11. A surface for footpad assembly 45 or 46 mount is identified by the numeral 74 which is formed with rare earth magnets 75 and 76. Rare earth magnet 75 is also a pneumatic piston within cylinder space 79 which is moved with air pressure and controlled by values 77 and 78. Magnetic coupling of rare earth magnets 75 and 76 to each other cause footpad assembly 45 and/or 46 x motion. This arrangement is better seen in FIG. 11A, which is a view taken along the line A—A in FIG. 11. There are two air inlet and exhaust valves 77 and 78 that control a charge of compressed air with the space 79.

Figure 11:
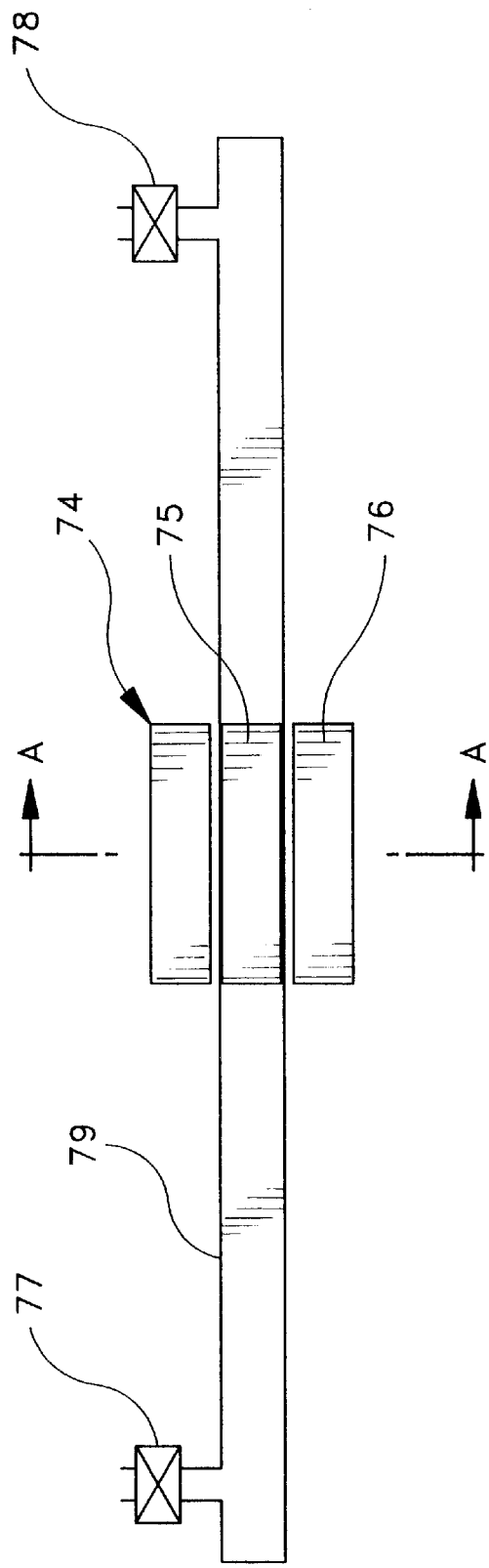
FIG. 11 and FIG. 11A illustrate schematically an actuator arranged according to the invention.
Figure 11A:
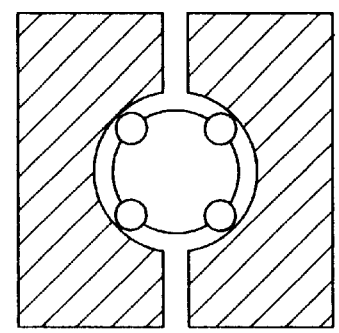

A footpad assembly 46 and a pneumatic/magnetic actuator shown in FIG. 11 are connected to form the stepper assembly of FIG. 3, for example. These stepper assemblies are assembled on x rails, i.e., extending in the X axis and identified by the legend "FIG. 12"in FIG. 7, and are part of welded steel tubular frame 80, FIG. 12, and supported on rod bearings 81 in FIG. 7.

The stroke required for the pneumatic/magnetic actuator shown in FIG. 11 is 8 feet. This allows for the longest stride of 5 feet plus 3 feet to allow for user accelerations and decelerations. Four of these actuators are used; two in each stepper assembly.

The rod bearings 81 and 82, FIG. 12, that carry the footpad assemblies 45 and 46 are mounted on a light-weight welded tubular steel frame 80. The welded tubular steel frame 80 is constructed of four trusses. Two trusses are used for each stepper assembly -one under each rod bearing assembly.

These trusses are built with welded 1 inch square steel tube, and are rigidly tied together laterally, with welded tube. The welded tubular steel frame 80 is restrained against lateral motion by a central bearing 83, which is the center of rotation for the system of the invention.

Although this bearing carries no vertical load, it must be of sufficient diameter to clear the path of the X tambours 41 and 42, FIG. 8. Rotation of the mechanical system 40 is achieved on rubber-tired rotating drive wheels 84 and 85 at the extremities of the trusses.

Power to the rotating drive wheels 84 and 85 is provided by electric motors 86 and 87, respectively. One driving wheel is located at each end of the truss assembly. The rotating drive wheels 84 and 85 must also clear the path of the X tambours 41 and 42 and so must be placed off-center.

For balance, as shown in FIG. 13, an idler wheel 88 and 89 is mounted at each end of the truss assembly 80. For lateral stability, a light-weight truss 90 and 91 projects on both sides of the stepper assemblies, with an idler wheel 88 and 89 mounted at each of the ends of the trusses 90 and 91.

The footpad assembly 45 is shown in FIG. 13, in a raised position adjacent the X tambour 41. The rotating surface 43 is visible in this view also. To provide a guard against body parts and clothing getting caught in the path of the footpad assemblies 45 and 46, there are two tambour structures used. The X tambours 41 and 42 guard the space ahead of and behind footpad assemblies 45 and 46. The Y tambours guard the space to the left and right of Y transport 51 on each of the footpad assemblies 45 and 46. Tambours are rigid slats mounted on a continuous flexible belt.

The arrangement for one of the slats for the tambour structure is illustrated in FIG. 14 of the drawings and identified generally by the reference numeral 94.

Each slat 94 is formed as a graphite fiber/balsa/graphite fiber laminate. Balsa 95 is used in preference to plywood because its light weight to minimize power requirements is important, and the tambours will not be a primary walking surface. The sides 96 are preferably formed of rubber.

The X tambours 41 and 42 are passive in that they are driven by motion of the footpad assemblies 45 and 46; they do not contribute a force to drive the footpad assemblies. The X tambours 41 and 42 are a continuous belt connected to the footpad assemblies on the fore and aft faces. They roll on X tambour drums 92 and 93, FIG. 13.

Figure 15:
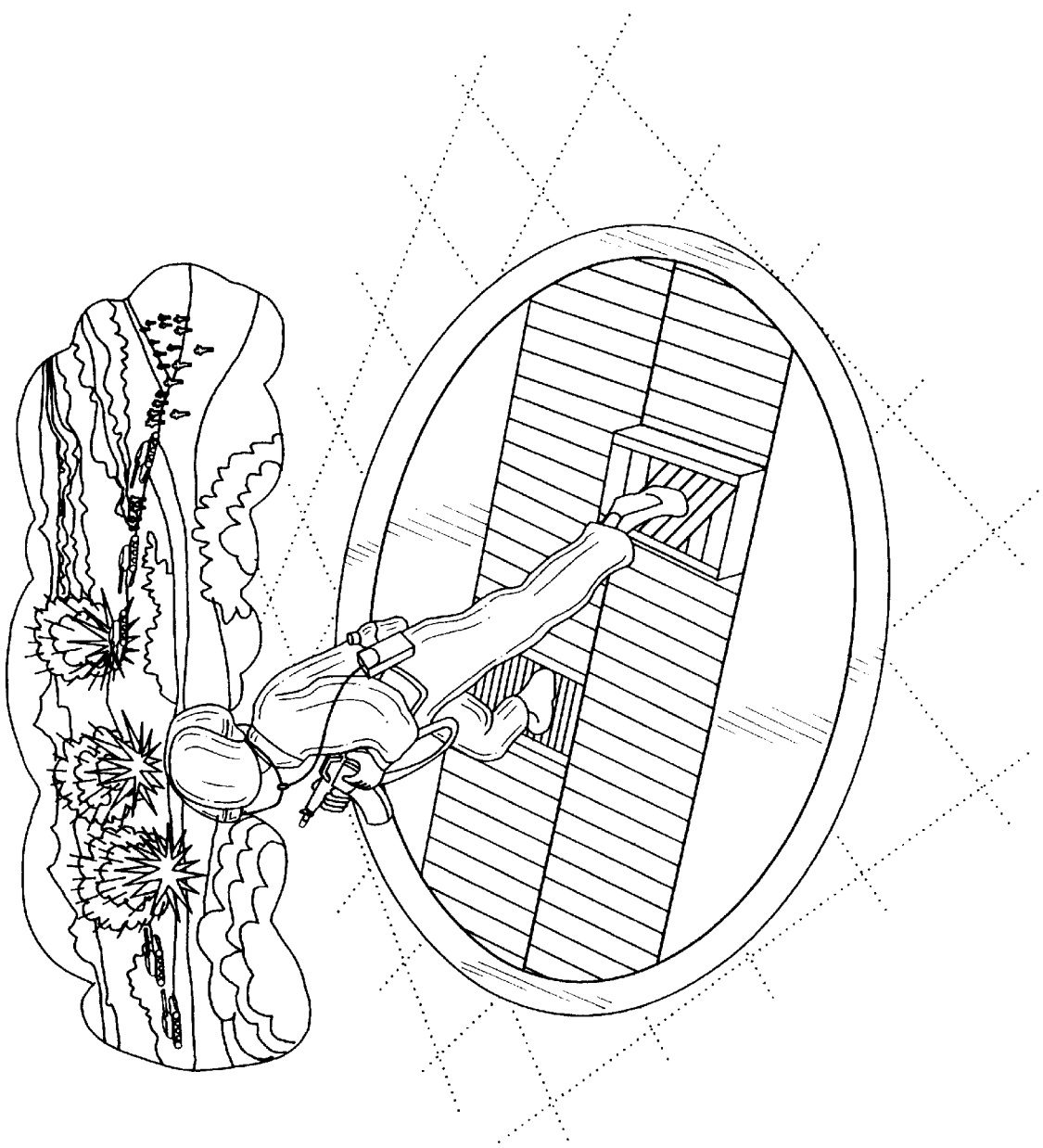
FIG. 15 is an artist's view in perspective that illustrates the functioning of the invention.

FIG. 15 is an artist's illustration of the structural arrangement of a system that is constructed and arranged in accordance with the system of the invention.

Although the invention has been described in detail, it is understood that changes and modifications can be made. Therefore, the invention is to be limited only by the following claims.

What is claimed is:

1. A system for a user simulate physical movement within a confined space,the system comprising:
   first and second independently movable footpad for supporting the feet of a user while operating the system;
   first rotatable means supporting said first footpad mechanically to permit adjusting the rotational position of said first footpad;
   second rotable means supporting said second footpad mechanically to permit adjusting the rotational position of said second footpad;
   tracker means for determining the location and the position of each footpad separately;
   computer means connected with said tracker means for generating signals to control adjustment in the rotational position of said first rotable means and said second rotatable means; and
   means for independently adjusting the position of said first and second footpads in response to said signals;
   whereby said user can perform physical motion that are realistic without attachments and while remaining in a confined space.

2. A system as defined by claim 1 wherein said first is supported by a first stepper unit and said second footpad, in turn, is supported by a second stepper unit whereby the position of said first and second footpads are adjustable independently.

3. A system as defined by claims 2 wherein each of said first and said second footpads includes side guards locaded to slide freely over said first and said second stepper units.

4. A system as defined by claim 1 wherein each of said first and said second rotable means includes a rotopad assembly mounted as an upper surface for contact with the feet of said user for providing a simulation of rotation.

5. A system as defined by claim 4 wherein each rotopad assembly of said first and said second rotatable means includes multiple pieces of about one-half inch tubing with a length in the order of 15 inches.

6. A system as definded by claim 5 wherein said multiple pieces of tubing in each rotopad assembly is held in a side-by-side relation by spring means.

7. A system as defined by claim 2 including bearing means mounted on turns means for supporting said stepper unit and said first and said second footpads.

8. A system as defined by claim 7 wherein said truss means is formed of tibular steel welded for rigid lateral support for said stepper units said footpads.

9. A system as defined by claim 7 including four wheels with rubber tires attached to said truss means for supporting said system rotationally during a simulation of physical.

10. A system as defined by claim 2 wherein said first stepper unit includes sliding guide means connected to said first footpad; and said second stepper unit includes sliding guide means connected to said second footpad; whereby a surface is formed for the safety of each foot of a user.

11. A system as defined by claim 2 including turntable means supporting both said first stepper unit and said second stepper unit, whereby said stepper units are rotatable together.

12. A system as defined by claim 11 wherein said turntable means includes drive means for making adjustments in a rotational position of said turntable means.

13. A system as defined by claim 12 wherein said turntable means includes connection means so that said adjustments in said rotational position of said turntable are in response to said signals generated by said computer means.

14. A system for a user to simulate physical movement within a confined space, the system comprising:

tracking the feet, separately, of said user and generation position and attitude signals;

transmitting said position and attitude signals to a providing any movement in system components; and computer and controller for generation and executing system comtrol commands;

converting said system control commands to analog signal and connecting them to electrical drive means for moving separate surfaces independently for each foot.

15. A system as defined by claim 14 including encoding user movement into position signals and connecting such positions to said computer for generating a true instantaneous position signal and connecting it for developing subsequent system commands.

* * * * *

UNITED STATES PATENT AND TRADEMARK OFFICE
CERTIFICATE OF CORRECTION

PATENT NO. : 5,913,684                                Page 1 of 2
DATED      : Jun. 22, 1999
INVENTOR(S): Latham, et al It is certified that error appears in the above-identified patent and that said Letters Patent is hereby corrected as shown below:

Col. 8, line  9, After "user", insert --to--;
 "      "   11, "footpad" should read --footpads--;
 "      "   16, "rotable" should read --rotatable--;
 "      "   22, "adjustment" should read --adjustments--;
 "      "   23, "rotable" should read --rotatable--;
 "      "   28, "motion" should read --motions--;
 "      "   31, After "first", insert --footpad--;
 "      "   34, "position" should read --positions--;
 "      "   40, "rotable" should read --rotatable--;
 "      "   51, "turns" should read --truss--;
 "      "   51, "unit" should read --units--;
 "      "   54, "tibular" should read --tubular--;
 "      "   55, After "units", insert --and--;
 "      "   58, After "physical", insert --movement--;
Col. 9, line 10, "generation" should read --generating--;
 "      "   12, Delete "pro-";
 "      "   13, Delete "viding any movement in
                         system components; and";

UNITED STATES PATENT AND TRADEMARK OFFICE
CERTIFICATE OF CORRECTION

PATENT NO. : 5,913,684
DATED : Jun. 22, 1999
INVENTOR(S) : Latham, et al

It is certified that error appears in the above-identified patent and that said Letters Patent is hereby corrected as shown below:

Col. 10, line 1, "generation" should read --generating--;
"      "    3 & 4, "signal" should read --signals--;
"      "    4, After "for", insert --providing any movement in system components; and--.

Signed and Sealed this

Twenty-second Day of February, 2000

Attest:

Q. TODD DICKINSON

Attesting Officer

Commissioner of Patents and Trademarks